United States Patent [19]

Kawamura et al.

[11] Patent Number: 5,895,533
[45] Date of Patent: *Apr. 20, 1999

[54] BERYLLIUM-COPPER BONDING MATERIAL

[75] Inventors: Hiroshi Kawamura, Mito; Kiyotoshi Nishida, Nagoya; Naoki Sakamoto, Higashi-Ibaraki-Gun, all of Japan

[73] Assignees: Japan Atomic Energy Research Institute; NGK Insulators, Ltd., both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/601,107

[22] Filed: Feb. 16, 1996

[51] Int. Cl.$^6$ .................. C21D 1/18; C22F 1/18
[52] U.S. Cl. .......... 148/516; 148/521; 148/536; 228/194; 428/618; 428/675
[58] Field of Search ............... 420/469, 494; 148/132, 516, 521, 536; 428/618, 675, 617; 228/262.1, 262.6, 194, 228, 231

[56] References Cited

U.S. PATENT DOCUMENTS 2,534,643  12/1950  Warner ........................ 420/494

FOREIGN PATENT DOCUMENTS 62-151533  7/1987  Japan .

OTHER PUBLICATIONS

Dreizler et al., "Preparation and properties of P/M [powder metallurgy] copper-beryllium alloys," Mod. Develop. Powder Met. (1973), vol. date 1974, 7, 505–17, (abstract only).

Eckman et al., "Diffusion bonding of beryllium–copper alloys," J. Mater. Sci. (1992), 27(1), 49–54, (abstract only).

"Proceedings of the 18th Symposium of Fusion Technology", Herschback et al., Fusion Technology 1994, Aug., 1994, vol. 1, pp. 431–434.

"Proceedings 2nd IEA International Workshop on Beryllium Technology for Fusion", Glen R. Longhurst, Sep., 1995, pp. 364–380.

"Beryllium-metals joints for application in the plasma-facing components", V.R. Barabash et al., Journal of Nuclear Materials 212–215 (1994) pp. 1604–1607.

Primary Examiner—Sikyin Ip
Attorney, Agent, or Firm—Wall Marjama Bilinski & Burr

[57] ABSTRACT

For bonding pure beryllium to a copper alloy, a beryllium-copper material comprising a single layer or multiple layers having a thickness of 0.3–3.0 mm and containing at least 50 atomic % of Cu is inserted between the pure beryllium and the copper alloy to prevent bonding strength from degrading in the bonding process or during operation of a nuclear fusion reactor, by effectively mitigating formation of brittle intermetallic compounds and generation of thermal stress at the bonding interface.

8 Claims, 4 Drawing Sheets

FIG_3

BERYLLIUM-COPPER BONDING MATERIAL

FIELD OF THE INVENTION

This invention relates to a functionally gradient beryllium-copper materials, which is particularly suitable for bonding pure beryllium to pure copper or copper alloy.

BACKGROUND ART

In nuclear fusion reactors, beryllium is considered a promising plasma-resistant material due to its excellent heat resistance and suppressed absorption of tritium. However, beryllium lacks sufficient thermal conductivity and may thus undergo an inside heat accumulation. Therefore, as shown in FIG. 1, beryllium is designed to be bonded to a pure copper or copper alloy as a heat conductive material.

In FIG. 1, reference numeral 1 denotes a pure beryllium, 2 a pure copper or copper alloy, and 3 a cooling pipe.

Conventionally, vacuum silver soldering has been mainly used as the bonding method though it is pointed out that this method may adversely affect plasma and that it lacks reliability in actual plant level.

That is to say, in the case of vacuum silver soldering, as silver is transformed into cadmium by nuclear reaction, it is highly likely that silver is mixed in plasma as impurities thereby adversely affecting it. Moreover, there may occur a chemical reaction between the solder material and bonded material; therefore, it is difficult to obtain achieve reliable bonding.

Thus, diffusion bonding method has been studied as a new bonding technique, though a satisfactory result has not yet been achieved.

That is to say, in the case of diffusion bonding, it is highly likely that intermetallic compounds are formed between pure beryllium and pure copper or copper alloy. Moreover, there is a significant difference in thermal expansion coefficient between pure beryllium and pure copper or copper alloy. In view of the above, there has been no effective solution for a problem of decreased bonding strength which is caused by thermal stress occurring during the bonding process or during operation of the nuclear fusion reactor.

DISCLOSURE OF THE INVENTION

It is an object of the present invention to effectively solve the abovementioned problems and provide a functionally gradient beryllium-copper material which is suitable for bonding pure beryllium to pure copper or copper alloy, having a satisfactory thermal conductivity and being capable of maintaining a satisfactory bonding strength during the bonding process or during operation of the nuclear fusion reactor, by preventing formation of brittle intermetallic compounds in the bonding section and mitigating occurrence of thermal stress.

To this end, the present invention provides a functionally gradient beryllium-copper materials suitable for bonding pure beryllium to pure copper or copper alloy, comprising a single layer or a plurality of layers of Be—Cu alloy having a thickness of 0.3–3.0 mm and containing at least 50 atomic % of Cu, wherein the Be—Cu alloy layer situated closer to the pure copper or copper alloy has a composition with a higher Cu content.

According to the present invention, an oxygen-free copper is particularly suitable for the pure copper, and an $Al_2O_3$-dispersion strengthened copper, a CuCrZr alloy, a CuNiBe alloy, a CuCrZrSi alloy, a CuW alloy, etc., are particularly suitable for copper alloy.

The present invention is based on experimental results to be explained hereinafter.

At the outset, the inventors conceived to insert a thin sheet of Be—Cu alloy as a bonding material when a pure beryllium is bonded to a pure copper or copper alloy (hereinafter collectively referred to as "copper alloy"), and performed a diffusion bonding with one or more Be—Cu alloy sheets of various Be contents inserted as a bonding material.

As a result, the inventors found that there were instances in which the materials could be successfully bonded and other instances in which the bonding could not be successfully achieved, so that one cannot definitely predict the bonding condition.

Then, the inventors investigated various characteristics of Be—Cu alloy, in particular, thermal conductivity from the viewpoint of heat conductive capacity, and thermal expansion coefficient and formation of brittle intermetallic compounds from the viewpoint of bonding strength.

First, the inventors prepared eleven testpieces changing the Cu content by 10 atomic % from a pure beryllium to a pure copper as shown in the following Table 1, and measured the thermal conductivity at various temperatures.

The result obtained is illustrated in FIG. 2.

TABLE 1

| | (atomic %) | | | | | | | | | | |
|---|---|---|---|---|---|---|---|---|---|---|---|
| | 1 | 2 | 3 | 4 | 5 | 6 | 7 | 8 | 9 | 10 | 11 |
| BE | 100 | 90 | 80 | 70 | 60 | 50 | 40 | 30 | 20 | 10 | 0 |
| Cu | 0 | 10 | 20 | 30 | 40 | 50 | 60 | 70 | 80 | 90 | 100 |

As can be appreciated from FIG. 2, the thermal conductivity of Be—Cu alloy does not gradually increase in proportion to the content of copper from pure beryllium to pure copper; rather, at every measuring temperature, it undergoes a reduction in the case of a low Cu content and becomes higher than that of beryllium when the content of Cu increases to at least 50 atomic %, and thereafter increases to the thermal conductivity of pure copper in a sense of quasi-quadric function curve.

Therefore, from the viewpoint of heat conductive capacity, it has been found necessary to use a Be—Cu alloy containing at least 50 atomic % of Cu.

In the next place, the inventors measured the thermal expansion coefficient with the same testpieces.

The result obtained is illustrated in FIG. 3.

As can be appreciated from FIG. 3, the thermal expansion coefficient of Be—Cu alloy increases approximately in proportion to the Cu content.

Therefore, a Be—Cu alloy containing at least 50 atomic % of Cu is particularly suitable for functionally gradient material having a satisfactory thermal conductivity and a reduced difference in thermal expansion coefficient between the pure beryllium and the copper alloy.

It has been further found that the functionally gradient material need not be in the form of a single layer, and multiple layers comprising two, three or more layers may also be used. In particular, the multiple layers are more advantageous than a single layer in terms of fatigue-resistant strength for a repeated thermal stress. However, in the case of multiple layers, it is important for the Be—Cu alloy layer situated closer to the copper alloy side to have a composition with a higher Cu content.

3

In this instance, when the functionally gradient material of Be—Cu alloy is a single layer, it is preferable for the Be—Cu alloy to have a composition which comprises 50–90 atomic % of Cu.

When the functionally gradient material has two layers, preferably, the first layer contains 50–80 atomic % of Cu and the second layer contains 60–90 atomic % of Cu. Also, when the functionally gradient material has three layers, preferably, the first layer as counted from the beryllium side contains 50–70 atomic % of Cu, the second layer contains 60–80 atomic % of Cu and the third layer contains 70–90 atomic % of Cu, respectively.

Furthermore, it has been found necessary for the thickness of the functionally gradient material to be 0.3–3.0 mm for both cases of a single layer and the multiple layers.

This is because the thickness less than 0.3 mm is not sufficient for reducing the difference in thermal expansion coefficients while the thickness more than 3.0 mm reduces the heat conductive capacity from the pure beryllium.

Furthermore, as regard the reduction in bonding strength due to brittle intermetallic compound formed in the bonding interface of pure beryllium and copper alloy, which has conventionally been a problem, it has been found that such a problem can be advantageously eliminated by using a powder sintering process when manufacturing the functionally gradient beryllium-copper materials.

That is, when pure beryllium is simply bonded to a copper alloy, the bonding strength at the bonding interface is degraded due to brittle intermetallic compounds, such as $Be_3Cu(\delta)$ and $BeCu(\gamma)$, which are formed in the bonding interface in a laminated manner when the bonding interface is heated to a temperature not less than 400° C. in the bonding process or during operation of the nuclear fusion reactor.

Furthermore, when the bonding interface is heated to a temperature over 600° C., a third intermetallic compound, i.e., $BeCu(\beta)$, is formed and this $\beta$ phase decomposes into Cu and $\gamma$ phases at 620° C. by eutectoid reaction in the cooling process, which causes significant volumetric shrinkage, cracking and significantly degraded bonding strength.

In this respect, by using a powder sintering process, even when the intermetallic compounds, such as the $\delta$ phase and the $\gamma$ phase, are formed during the sintering process, they are formed around the beryllium particles with the beryllium particles as the core. Thus, a functionally gradient beryllium-copper material wherein such intermetallic compounds are finely dispersed in its surface is substantially free from formation of brittle intermetallic compounds at the interface of the pure beryllium in laminated manner, thereby making it possible to highly improve the bonding strength at the bonding interface.

Furthermore, as the functionally gradient beryllium-copper material according to the present invention has a satisfactory heat conductive capacity, as described above, the temperature at the bonding interface does not exceed 600° C. even during operation of the nuclear fusion reactor. It is thus possible to effectively prevent formation of cracks due to formation and decomposition of the $\beta$ phase. Even if the $\beta$ phase is formed, the direct contact area of pure beryllium and copper alloy is small and it is thus possible to significantly mitigate degradation of bonding strength due to cracks, as compared to conventional materials.

A preferred manufacturing method according to the present invention is illustrated in FIG. 4.

As shown in FIG. 4, the Be powder and Cu powder preferably under 200 mesh are mixed mechanically, and are subsequently hot-pressed and then formed into a shaped body by a hot isostatic press (HIP) sintering process.

Preferably, the hot-press conditions are 400–600° C. and 1–5 hours at 3–20 MPa, and the HIP conditions are 400–600° C. and 1–8 hours at 100–200 MPa, respectively.

Subsequently, the shaped body is machined and ground on both surfaces, so as to form a functionally gradient material for bonding.

The functionally gradient beryllium-copper material according to the present invention makes it possible to effectively bond a pure beryllium to a copper alloy without degrading the bonding strength, not only in the bonding process but also during operation of the nuclear fusion reactor, and exhibits distinguished performance when used as a plasma-resistant material.

BEST MODE FOR CARRYING OUT THE INVENTION

EXAMPLE 1

Figure 1:
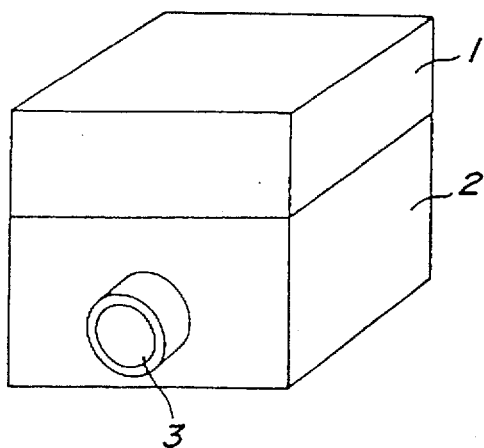
FIG. 1 is an illustration of the bonding state of pure beryllium and copper alloy according to a conventional method.
Figure 2:
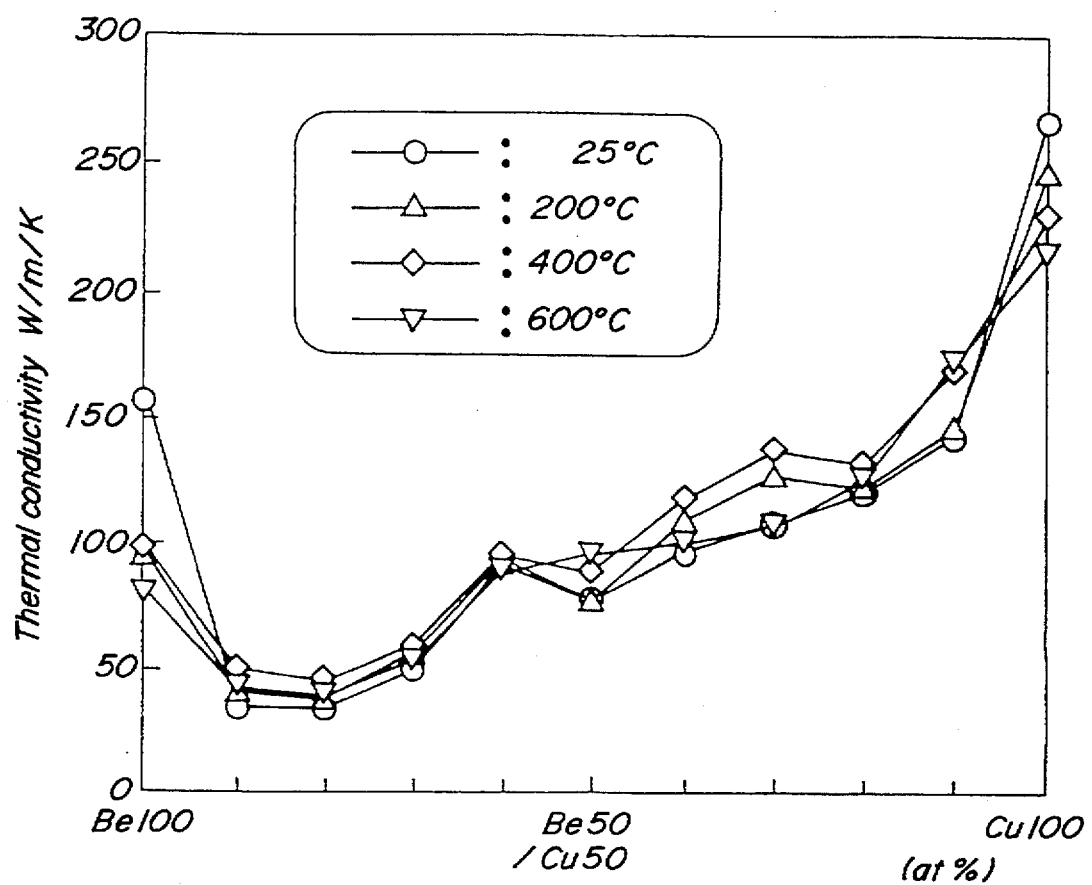
FIG. 2 shows the influence of composition change of Be—Cu alloy on the thermal conductivity.
Figure 3:
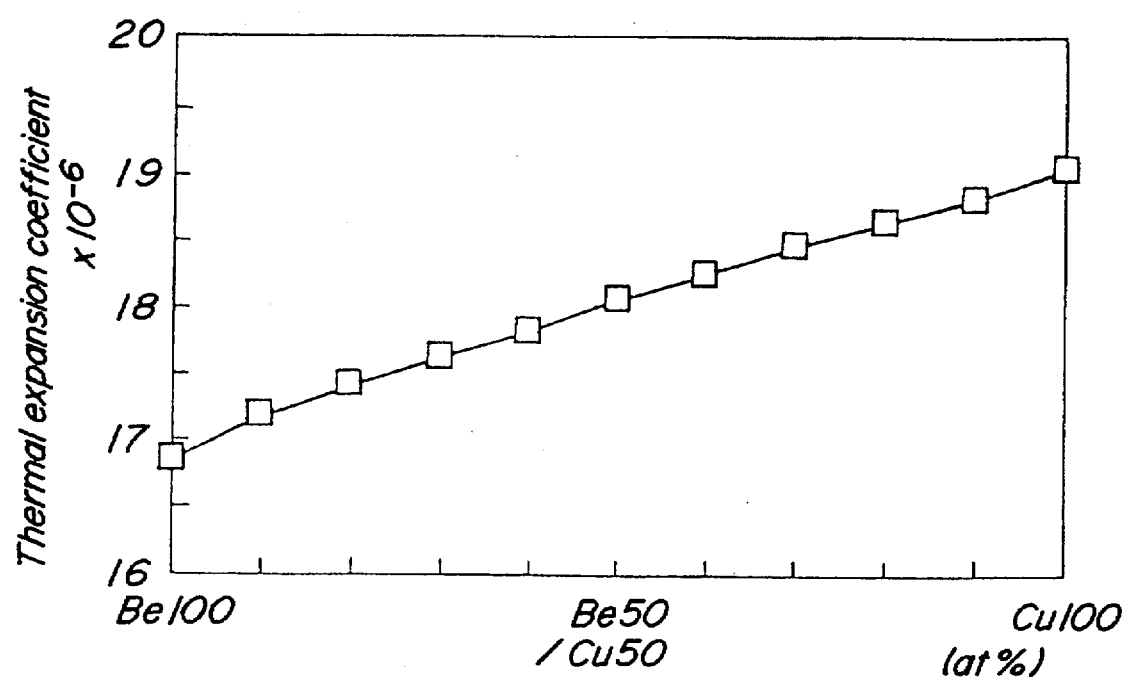
FIG. 3 shows the influence of composition change of Be—Cu alloy on thermal expansion coefficient.
Figure 4:
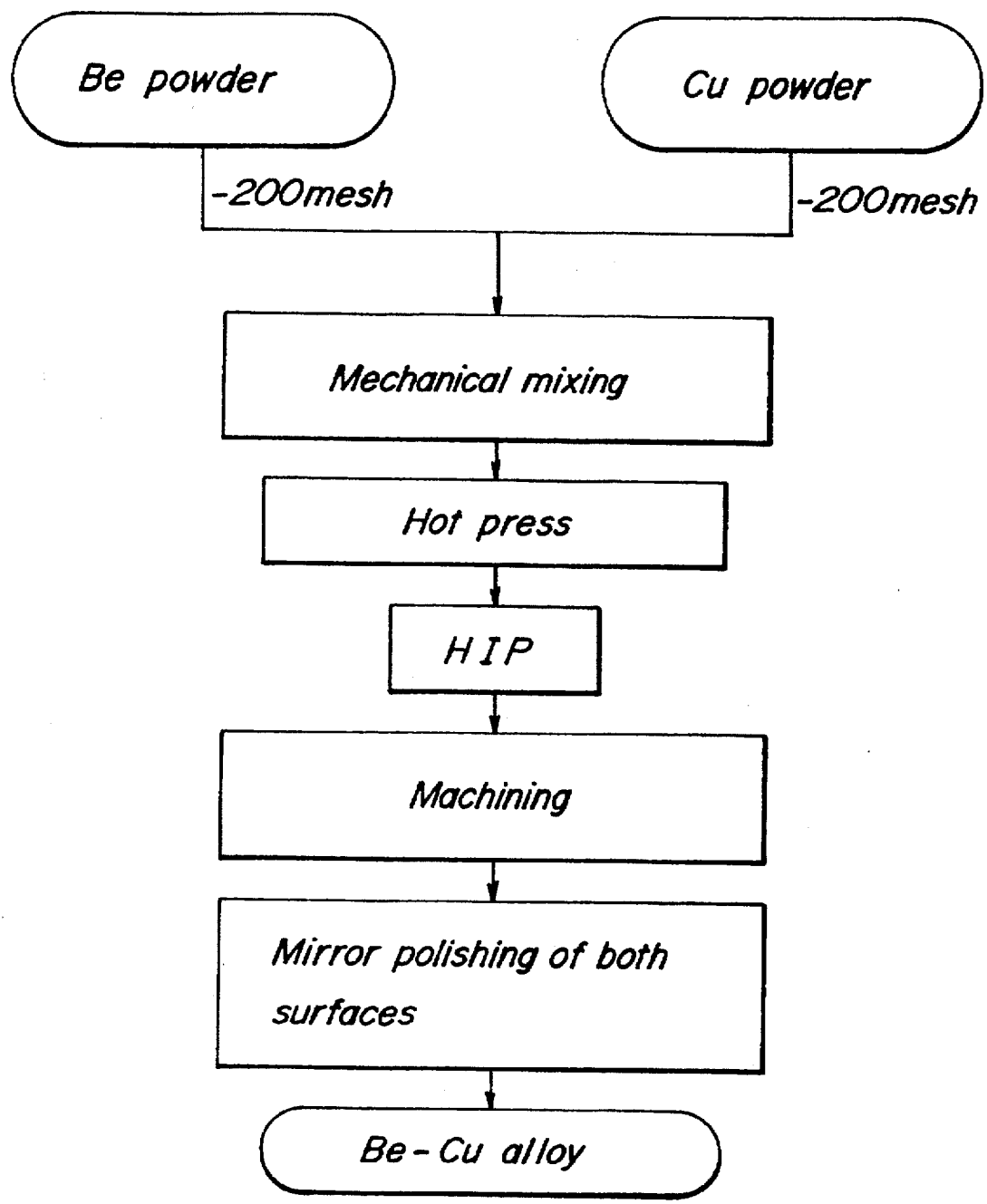
FIG. 4 shows a preferred manufacturing process of Be—Cu alloy according to the present invention.

According to the manufacturing process shown in the above FIG. 4, 11 g of Be powder under 200 mesh and 704 g of oxygen-free Cu powder under 200 mesh were mixed, hot-pressed at 6.9 MPa and 600° C. for 3 hours and formed into a shaped body by a HIP process at 192 MPa and 600° C. for 2 hours, and then machined and polished on both surfaces to form an alloy sheet having a thickness of 10 mm and a composition of 10 atomic % of Be and 90 atomic % Cu.

Figure 5:
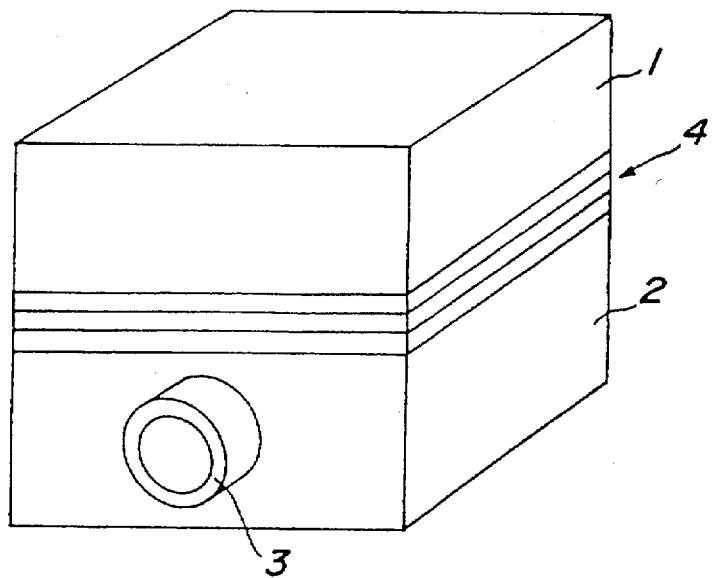
FIG. 5 is an illustration of the bonding state of pure beryllium and copper alloy according to the present invention.

As shown in FIG. 5, this alloy sheet was inserted between a pure beryllium 1 and an oxygen-free copper 2 as a bonding material 4, and a diffusion bonding was performed at 600° C. and 150 MPa.

The bonding strength of the testpiece obtained as above was measured and it has been found that the bonding strength was 25 $kgf/mm^2$ which is significantly improved as compared to the bonding strength of 15 $kgf/mm^2$ which could be achieved by a conventional simple diffusion bonding.

Figure 6A:
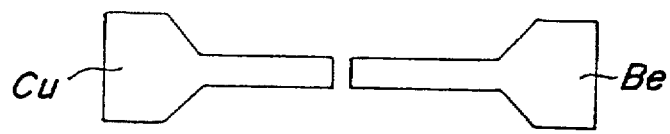
FIG. 6a illustrates the breaking point of a prior art testpiece subjected to a tensile test and FIG. 6b illustrates the breaking point of a testpiece of the present invention subjected to a tensile test.
Figure 6B:
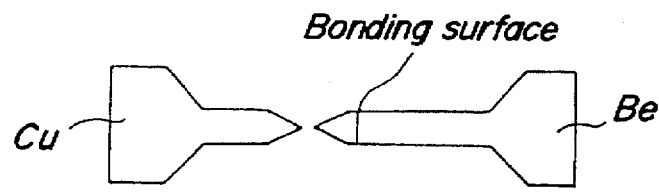

Moreover, as shown in FIGS. 6a and 6b, the breaking point of the testpiece is situated in the oxygen-free copper side in the case of the present example (FIG. 6b), while that of the testpiece of a conventional material is in the bonding interface (FIG. 6a). It will be appreciated that the breaking strength of 25 $kgf/mm^2$ is the strength of oxygen-free copper itself and that the bonding interface has a strength which is greater than that of oxygen-free copper.

EXAMPLE 2

Two kinds of sintered testpieces were prepared by the same process as example 1, wherein one testpiece has a thickness of 1 mm and a composition of 10 atomic % of Be and 90 atomic % of Cu, while the other testpiece has a thickness of 1 mm and a composition of 20 atomic % of Be and 80 atomic % of Cu.

Subsequently, as shown in FIG. 5, these two kinds of testpieces were stacked with the other and inserted between the pure beryllium and an oxygen-free copper as a bonding material, with the sintered testpiece having a higher Cu content, i.e., the testpiece having the composition of 10 atomic % of Be and 90 atomic % of Cu, situated adjacent to the copper alloy, and a diffusion bonding was then performed at 600° C. and 150 MPa.

The bonding strength of the testpiece obtained by the above process is 25 kgf/mm$^2$ and the breaking point is also situated in the oxygen-free copper side.

EXAMPLE 3

The bonding strength and the breaking point were investigated, with respect to a sintered material having a thickness of 1 mm and a composition of 10 atomic % of Be and 90 atomic % of Cu, and also with respect to the same sintered material which is stacked with another sintered material having a thickness of 1 mm and a composition of 20 atomic % of Be and 80 atomic % of Cu. These sintered materials were used as the inserted material, and the materials shown in Table 2 were used as the copper alloy.

The result obtained is shown in Table 2.

TABLE 2

| Kinds of alloy | Number of sheets inserted | Bonding strength (kgf/mm$^2$) | Breaking position |
| --- | --- | --- | --- |
| Al$_2$O$_3$-dispersed strengthened Cu | 1 | 45 | copper alloy side |
| 0.3%Cr—0.1%Zr—Cu alloy | 1 | 65 | copper alloy side |
| 0.3%Ni–1.8%Be—Cu alloy | 1 | 85 | copper alloy side |
| 0.35%Cr—0.1%Zr—0.03%Si—Cu alloy | 2 | 55 | copper alloy side |
| 70%W—Cu alloy | 2 | 40 | copper alloy side |

As can be appreciated from Table 2, when the functionally gradient material according to the present invention is used as the inserted material, a satisfactory bonding strength not less than 25 kgf/mm$^2$ could be obtained in every case.

We claim:

1. A method of bonding a pure beryllium component to a pure copper or copper alloy component, comprising the steps of:

disposing a beryllium-copper material between a pure beryllium component and a pure copper or copper alloy component, wherein the beryllium-copper material is in layer form having a thickness of 0.3 to 3.0 mm, contains Be and at least 50 atomic percent Cu, and is formed by sintering a mixture of beryllium powder and copper powder; and heating the beryllium-copper material and components to diffusion bond the components to one another.

2. The method of claim 1, wherein the beryllium-copper material contains at least 10 atomic 2 percent Be.

3. The method of claim 1, wherein the beryllium-copper material is a single layer and contains 50–90 atomic percent Cu.

4. The method of claim 1, wherein the beryllium-copper material comprises multiple layers, including a layer for contacting the pure copper or copper alloy component that has a higher content of copper than the other layers of the material.

5. The method of claim 4, wherein the beryllium-copper material comprises first and second layers, the first layer containing 50–80 atomic percent Cu, and the second layer containing 60–90 atomic percent Cu, the second layer contacting the pure copper or copper alloy component.

6. The method of claim 4, wherein the beryllium-copper material comprises three layers, including a first layer containing 50–70 atomic percent Cu, a second layer containing 60–80 atomic percent Cu, and a third layer containing 70–90 atomic percent Cu, the third layer contacting the pure copper or copper alloy component.

7. The method of claim 1, wherein the pure copper component comprises oxygen-free copper.

8. The method of claim 1, wherein the copper alloy component is a member selected from the group consisting of Al$_2$O$_3$ dispersion strengthened copper, CuCrZr alloy, CuNiBe alloy, CuCrZrSi alloy, and CuW alloy.

* * * * *